United States Patent [19]

Schulz

[11] Patent Number: 5,373,672
[45] Date of Patent: Dec. 20, 1994

[54] ARRANGEMENT OF MOUNTING SECTIONS FOR THE FASTENING OF A PANE OF GLASS

[75] Inventor: Harald Schulz, Kammeltal/Ettenbeuren, Germany

[73] Assignee: Josef Gartner & Company, Germany

[21] Appl. No.: 747,877

[22] Filed: Aug. 19, 1991

[30] Foreign Application Priority Data

Aug. 20, 1990 [DE] Germany .............................. 4026294
Jan. 9, 1991 [DE] Germany .............................. 4100450

[51] Int. Cl.$^5$ .............................................. E04H 1/00
[52] U.S. Cl. ........................................ 52/235; 52/208; 52/824
[58] Field of Search .................. 52/425, 484, 486, 489, 52/764, 773, 774, 208, 222, 235, 399, 781, 204.55, 204.71, 823, 824, 656, 475, 397

[56] References Cited

U.S. PATENT DOCUMENTS

| | | | |
|---|---|---|---|
| 2,934,801 | 5/1960 | Blaszkowski | 52/399 |
| 2,989,338 | 6/1961 | Hezler, Jr. | 52/208 |
| 3,012,642 | 12/1961 | Emmerich | 52/399 |
| 3,040,847 | 6/1962 | Webster | 52/475 X |
| 4,364,209 | 12/1982 | Gebhard | 52/208 |
| 4,477,985 | 10/1984 | Yuan-Hsiang . | |
| 4,479,988 | 10/1984 | Dawson | 428/34 |
| 4,563,849 | 1/1986 | Mangal | 52/235 |
| 4,608,796 | 9/1986 | Shea, Jr. | 52/399 |
| 4,635,420 | 1/1987 | Batky | 52/309.1 |
| 4,640,072 | 2/1987 | Muhle | 52/403 |
| 4,799,344 | 1/1989 | Francis | 52/235 |
| 4,843,772 | 7/1989 | Lisa et al. | 52/475 X |
| 4,866,895 | 9/1989 | Hlavaty | 52/208 |
| 4,998,392 | 3/1991 | Massarelli et al. | 52/208 |
| 5,115,612 | 5/1992 | Newton et al. | 52/208 |

FOREIGN PATENT DOCUMENTS

| | | |
|---|---|---|
| 2619587 | 8/1989 | France . |
| 2653158 | 4/1991 | France . |
| 8708954 | 6/1987 | Germany . |
| 3624491 | 1/1988 | Germany . |
| 0301166 | 1/1989 | Germany . |
| 3728016 | 3/1989 | Germany . |
| 3808513 | 10/1989 | Germany . |
| 3810200 | 10/1989 | Germany . |
| 1221428 | 2/1971 | United Kingdom ............ 52/823 |
| 2155981 | 10/1985 | United Kingdom . |

*Primary Examiner*—Carl D. Friedman
*Assistant Examiner*—Creighton Smith
*Attorney, Agent, or Firm*—Anthony J. Casella; Gerald E. Hespos

[57] ABSTRACT

The present invention relates to an arrangement of mounting sections for the fastening of a pane of glass, particularly an outer wall or roof glazing, on a facade substructure. The edge of a pane of glass is to be gripped in firm application by a mounting section and nevertheless the danger of the breaking of the edge of the pane of glass is to be avoided. For this purpose, each mounting section is so developed, arranged or supported outside the edge of the pane of glass that, upon a bending of the pane, it carries out a predetermined turning movement around an axis of turn lying parallel to the edge of the pane of glass and outside of it. Furthermore, each mounting section is so developed with flexural elasticity in combination with the facade substructure bearing it or the play between mounting section and substructure that it can yield, following a bending of the edge of the pane of glass, within certain limits.

19 Claims, 11 Drawing Sheets

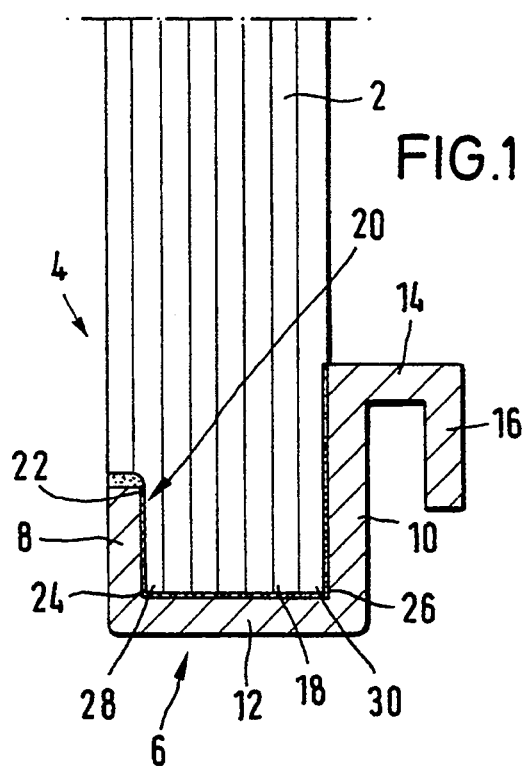
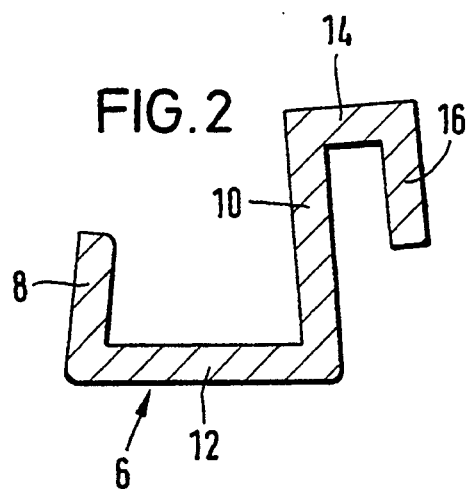
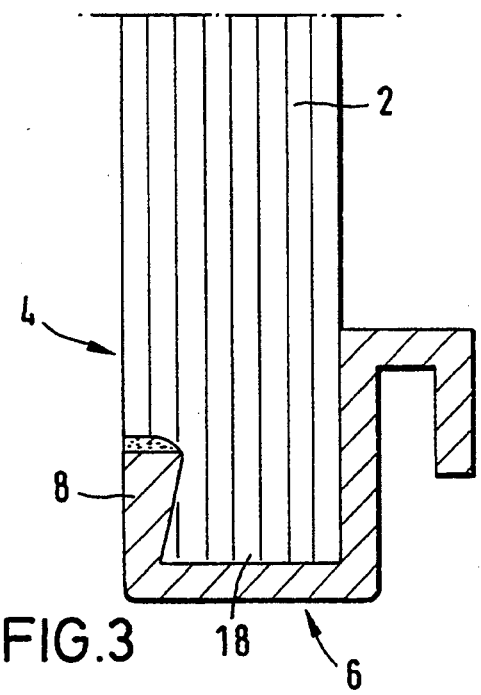
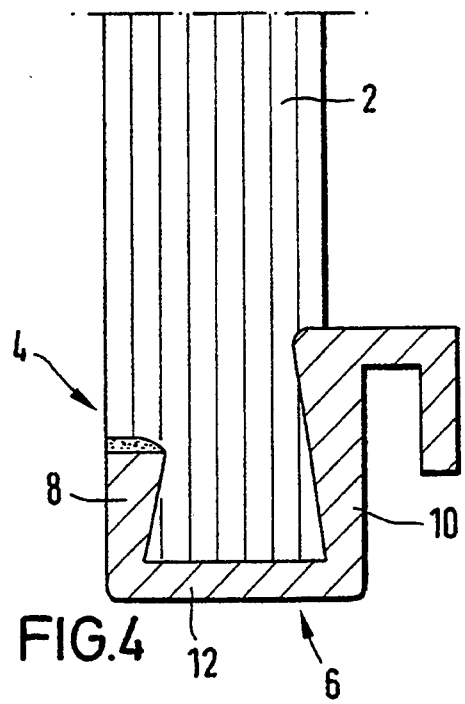

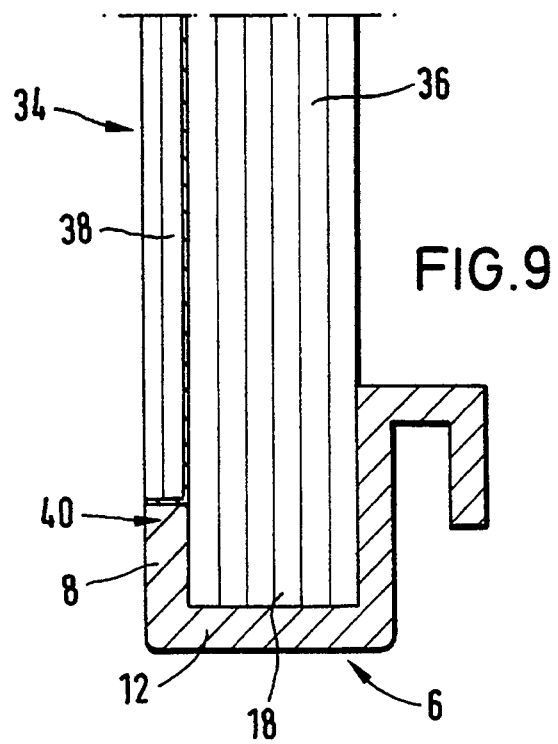
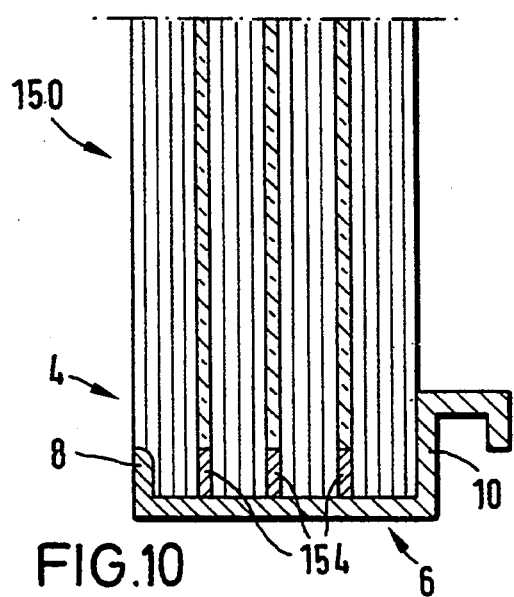
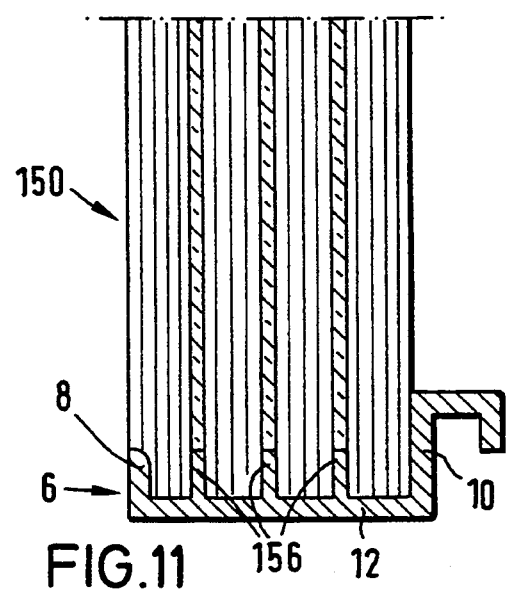

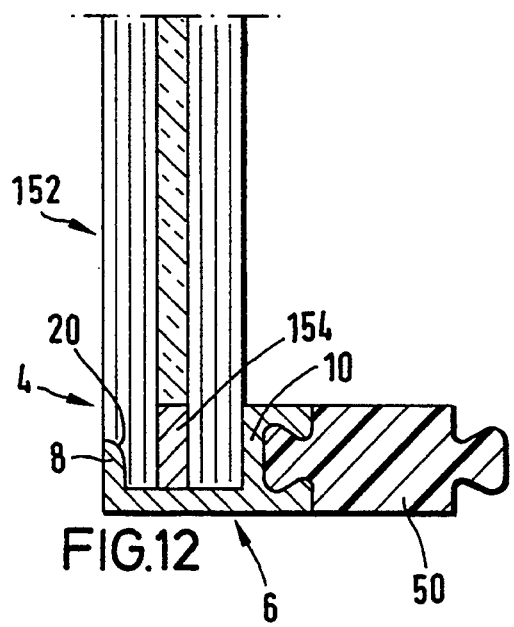
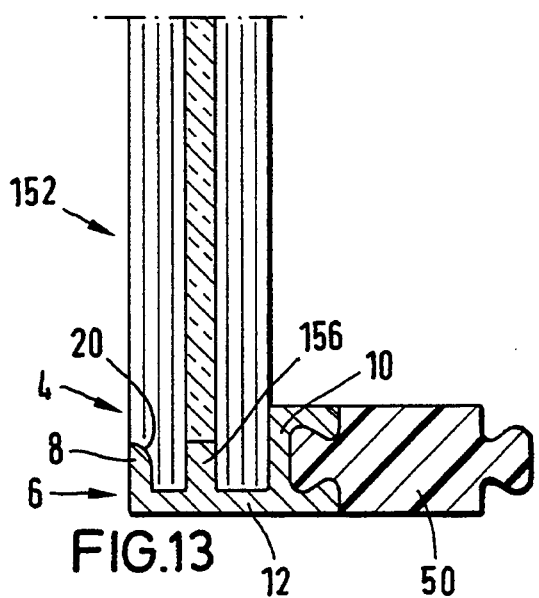
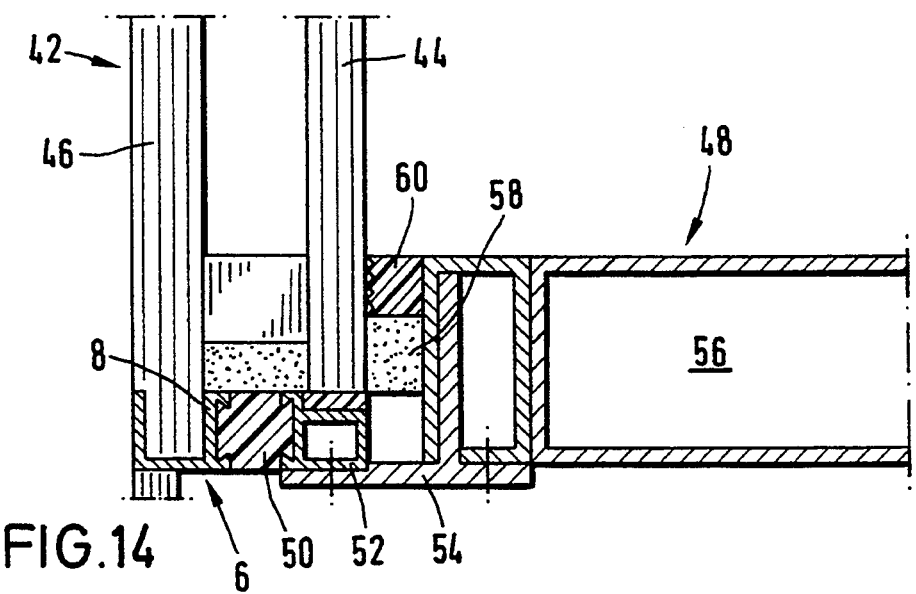

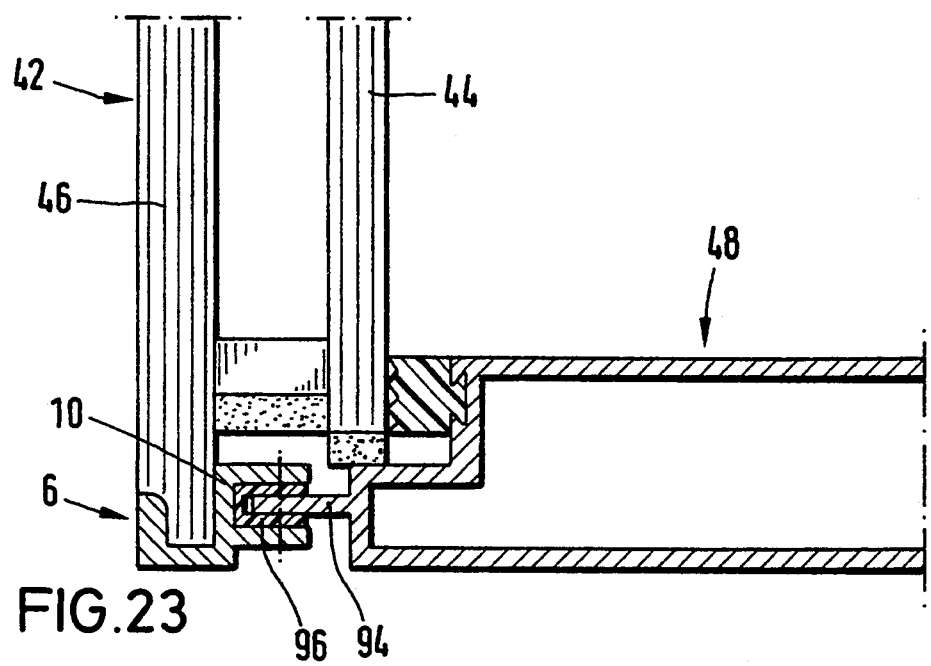
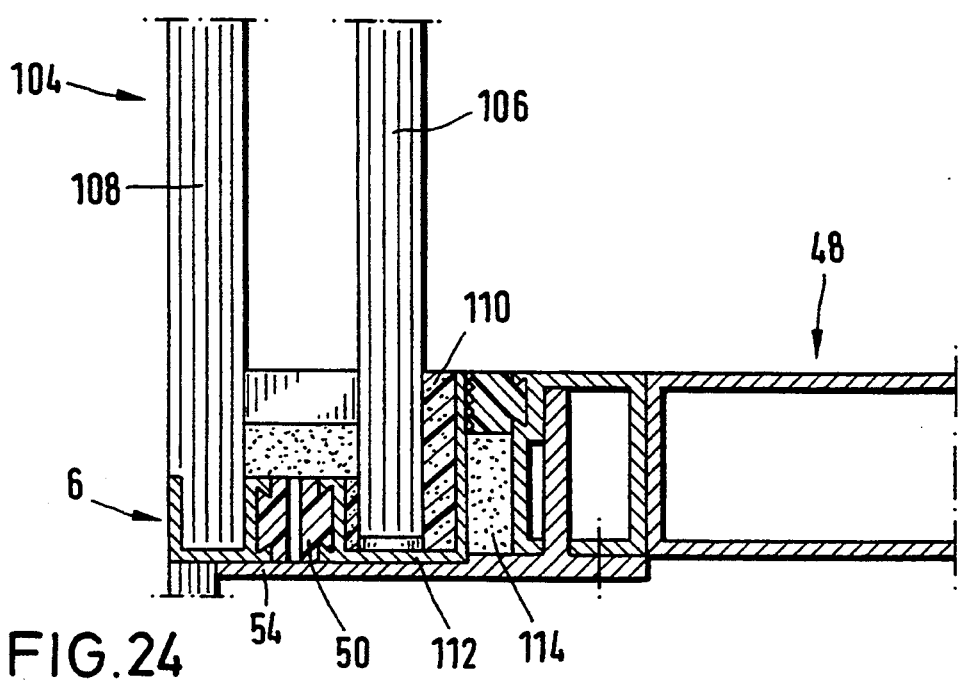

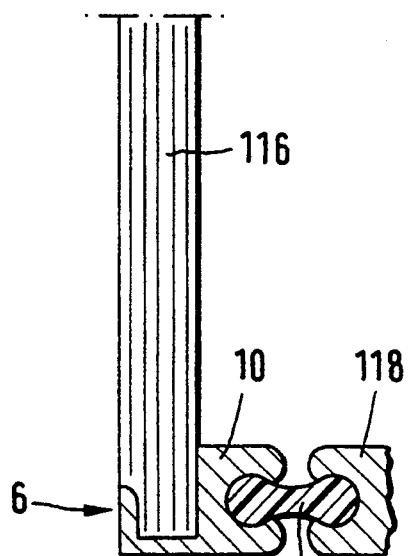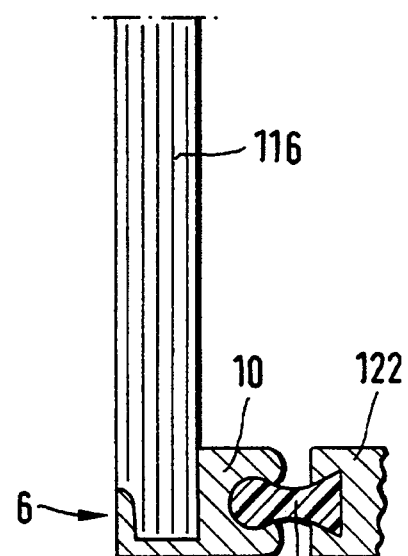
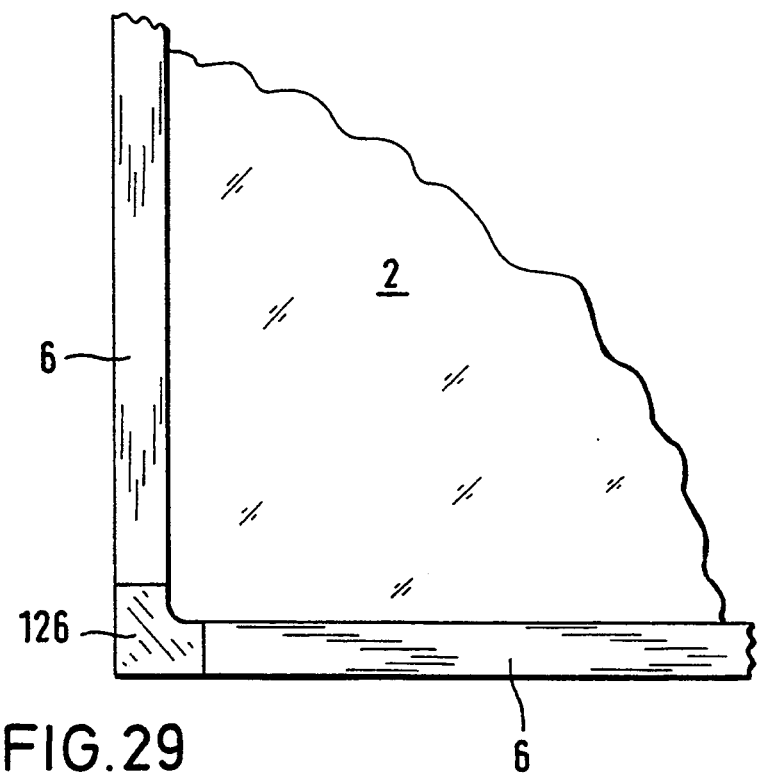

ARRANGEMENT OF MOUNTING SECTIONS FOR THE FASTENING OF A PANE OF GLASS

BACKGROUND OF THE INVENTION

The present invention relates to an arrangement of mounting sections for the fastening of a pane of glass, in particular an outer wall or roof glazing on a facade substructure, according to claim 1.

In the case of panes of glass in, for instance, an outer wall glazing, it is necessary to support and/or secure the lower and upper edges of the pane of glass by means of a mounting section if the pane of glass is to be arranged uncemented on the facade substructure. Furthermore, in the case of panes of glass which are arranged by cementing on the facade substructure, it is necessary, in addition, to secure at least the upper and lower edges of the pane of glass by mounting sections, in which connection a part of the mounting section must surround the edge of the pane of glass on the weather side so that the pane of glass will still be held to the facade substructure in case of failure of the cementing, for example, in the event of fire.

From Federal Republic of Germany OS P 38 05 513.5 filed Mar. 15, 1988 by Klaus Bischlipp, an arrangement of a mounting profile for the fastening of panes of glass of a double glazing is known in which the pane of glass arranged on the weather side is provided on its outer side with a step-shaped shoulder into which an outer bend of the mounting section engages. The mounting section of the known arrangement is a part of the facade substructure. The edge of the outside pane of glass is surrounded by the mounting section on the weather side, within the region of the edge of the glass. Between the surface of the glass facing the room side and a stabilization web of the mounting section arranged behind it, there is introduced an elastic bonding composition, as a result of which it is possible for the lower edge of the pane of glass to carry out a turning movement within the mounting section in response to wind pressure or suction.

In this known arrangement, in the event, for instance, of wind suction, the pane of glass comes against the free end of the outer bend of the mounting section and carries out a turning movement around this point or fictitious axis of rotation. In this connection, there is the danger that the edge of the pane of glass will slip out of the mounting section. Furthermore, as a result of this turning movement, or due to the resting of the edge of the pane of glass against the free end of the outer bend, peak loads are produced in the region of the edge of the glass, which loads can lead to the breaking of the glass. In the event of wind pressure, to be sure, there is no constraint on the rear side, but the lower edge of the pane of glass moves away from the outer bend of the mounting section. In this case, peak loads on the inner edge of the glass can also lead to the breaking of the glass. Furthermore, rain water or moisture can then enter into the region between the mounting section and the lower edge of the glass, which is undesirable. Finally, the edges of the pane of glass bend upon the deformation of the pane of glass as a result of wind suction or wind pressure. Such a bending leads, in the case of the known arrangement, to a pushing up between the edge of the pane of glass and the outer bend of the mounting section, which leads to leaks.

The object of the present invention is to obtain a permanently dependable mounting of panes of glass, particularly on a facade substructure, by the provision of mounting sections in connection with which breaking in the region of the edges of the glass is prevented while, in addition, cementing of the panes of glass on the facade substructure can be dispensed with.

This object is achieved by the features set forth in claim 1.

A permanently reliable mounting of glass panes is obtained when the edge of the pane of glass in gripped, applied firmly, on the outside and the inside by the bent arms of a mounting section. Such a gripping of the edge of the pane of glass has not been proposed up to the present time since the constraints in the region between a mounting section developed in this manner and the gripped edge of the pane of glass are so great that, upon wind pressure or suction, the breaking of the glass within the region of its edges must be expected. This problem is circumvented in accordance with the present invention in the manner that each mounting section is so developed, arranged or supported on the outside of the edge of the pane of glass that it permits a predetermined turning movement around an axis of turn which is parallel to the edge of the pane of glass and located outside said edge. This axis of turning can be formed in this connection either physically or fictitiously in given regions outside the edge of the pane of glass. One essential effect of the invention is that each mounting section, together with the firmly grasped edge of the pane of glass, can carry out a turning movement and in this way peak loads in the edge of the pane of glass can be avoided. By these turning movements of the mounting sections together with the firmly gripped edge of the pane of glass, the moments of force occurring in the edge of the pane of glass as a result of constraints in the mounting section are reduced to such an amount that the breaking of the edges of the pane of glass is out of the question.

Furthermore, each mounting section in combination with the substructure bearing it and/or the clearance between mounting section and substructure is developed or arranged in flexurally elastic manner, so that it can yield so as to follow along in a bending of the edge of the pane of glass within predetermined limits. In combination with the firm application of the bends of each mounting section, as provided in the invention, against the edge of the pane of glass, the above-mentioned flexurally elastic development of the mounting sections and their arrangement on the facade substructure which permits flexurally elastic movements, possibly with clearance between mounting section and substructure, plays a corresponding role.

For aesthetic considerations, it is provided in one advantageous embodiment of the invention that the outer bend of the mounting section engage into a stepped edge or step of the edge of the pane of glass so that the weather side of the pane of glass and the outer side of the outer bend lie flush in a plane.

The inner bend of the mounting section can in this case also engage into a step in the edge of the pane of glass.

The mounting section is preferably provided in the region of the edge of the pane of glass with a development of substantially U-shaped cross section, the inner bend being higher than the outer bend.

In order to achieve a favorable application or firm clamping of the mounting section on the edge of the pane of glass, the mounting section is pre-bent prior to its insertion. Upon the insertion of the panes of glass into the mounting section, the mounting section must accordingly first of all be bent elastically so as to produce permanent initial tensioning of the connection.

An additional avoidance of peak loads in the edge of the pane of glass is obtained in the manner that the outer end or bend facing the pane of glass and furthest from the region of the end of the pane of glass is rounded.

A dependable clamping firm of the pane of glass in the mounting section and the preventing of the slipping of the pane of glass out of the mounting section are advantageously obtained in the manner that the surface of the inner and/or outer bend facing the pane of glass is tapered from the edge thereof lying away from the region of closure of the pane of glass in wedge-shape towards the region of the end of the pane of glass. The lower region of the edge of the pane of glass which is developed tapered by the steps accordingly has a wedge-shaped development and is thereby reliably held in the mounting section.

A tight application of the edges in the end region of the lower edge of the pane of glass in the mounting section is obtained in the manner that the transition from the outer and/or inner bend to the connecting web of the mounting section arranged between them is rounded, since the corresponding edges of the end region of the pane of glass may also preferably have a rounded shape for reasons of manufacture.

An additional securing of the pane of glass in the mounting section is obtained by mounting means between the mounting section and the edge of the pane of glass. Such mounting means can preferably be created in the manner that the outer and/or inner bend have, on the surface facing the pane of glass, at least one continuous or discontinuous elevation, the edge of the pane of glass having grooves or depressions respectively at the corresponding places.

Instead of grooves, the mounting securing means may also consist of at least one row, advantageously arranged in a plane, of knobs on the outer and/or inner bend on the surface facing the pane of glass, in which case the edge of the pane of glass has a continuous ridge or depressions at the corresponding places.

Finally, conversely, elevations can be provided on the edge of the pane of glass, produced for instance from enamel by screen printing, which engage in corresponding continuous grooves or depressions on the surfaces of the outer and/or inner bend facing the pane of glass.

The penetration of moisture between the edge of the pane of glass and the mounting section is prevented by a seal, at least in the region of the free end of the outer bend of the mounting section. The seal in this connection may consist, for instance, of silicone or some other permanently elastic sealing material.

A firm attachment between the mounting section and the edge of the pane of glass can also be obtained in the manner that at least parts of the surfaces of the mounting section facing the edge of the pane of glass have a friction-increasing coating and/or a bonding agent.

For static and/or aesthetic considerations, the mounting profile preferably consists of special steel, in particular electrolytically blackened steel, or of aluminum, preferably anodized aluminum. Thus the mounting section can also be produced more simply by extrusion.

In order to keep the occurrence of moments of force and peak loads in the region of the edge of the pane of glass by the presence of the mounting section at a minimum, the axis of turn around which the predetermined movement of turning takes place is advantageously as close as possible to the edge of the pane of glass. In this way, the lever arm from the axis of turn to the edge of the pane of glass is kept small, thus leading to small moments of force in the region of the edge of the pane of glass.

A laminated glass pane consisting of two or more individual panes or a pane of glass consisting of individual panes with photovoltaic elements arranged between them can also be provided with the mounting section. Since the material present in the region between the individual panes—plastic or casting resin, for instance, in the case of the laminated glass pane and an interposed sheet with inserted photovoltaic elements in the case of the pane of glass having photovoltaic elements—is relatively soft as compared with the pane of glass and thus compressible, means which prevent the pressing together of the edge of the pane of glass in the region between the outer and inner bends of the mounting section are arranged in said region.

The means for preventing the pressing together can consist of pressure-resistant inserts which are arranged in each case between the individual panes of the pane of glass or of free pegs which are firmly attached to the connecting web of the mounting section. The pressure-resistant inserts, as well as the free pegs have a cross-sectional width which corresponds to the thickness of the material present in each case between the individual panes.

The specific cross-sectional height of the pressure-resistant inserts or free pegs is preferably equal to at least the cross-sectional height of the outer bend of the mounting section. The cross-sectional height can also preferably correspond to the height of the inner bend of the mounting section.

In the case of a double glazing or of a panel with pane of glass arranged as cover pane on the weather side, it is merely necessary to provide the pane of glass arranged on the weather side with a mounting section. Advantageously, in order to avoid the above-described peak loading or moments of force in the region of the edge of the pane of glass, it is provided in this connection that the axis of turn between the two panes of glass or in the region of the panel be arranged preferably at as short a distance as possible from the pane of glass arranged on weather side.

For static and other considerations, it, however, is also possible for the axis of turn to be arranged behind the room-side pane, of a double glazing or behind the room-side closure of the panel and, in this connection, to be arranged spaced as close as possible to this room-side pane or room-side panel closure in order, as explained, to minimize the peak loads of moments of force in the edge of the pane of glass.

In order to prevent peak loads of moments of force in the region of the edge of the room-side pane of glass of the region of the panel arranged behind the weather side pane of glass, said pane or region is preferably mounted in floating fashion or bedded elastically. Upon a turning movement, the edge of the pane of glass arranged on the room side or the corresponding edge of the panel region can then carry out a turning movement free of constraints.

The axis of turn is preferably within the region of a heat-insulating element which prevents the transmission of heat between the mounting section and the facade substructure, in particular a plastic part, and/or in the region of a specially developed connecting point between the mounting section and the facade substructure and/or the axis of turn is preferably developed in said regions. Thus, it is possible to use known elements, within the region of which the axis of turn can form as a result of the elasticity of said elements.

The insulating element and/or the connecting place advantageously reduce the moments of force transmitted to the edge region of the pane of glass so as to exclude the possibility of the breaking of the edge of the pane of glass.

The predetermined turning movement of the mounting section is preferably facilitated in the manner that the insulating element is arranged on the mounting section and/or the facade substructure via a rounded part, in the manner of a rotary joint.

A predetermined turning movement of the mounting section is, in addition, advantageously promoted if the stiffness of the insulating element around the axis of turn which forms is as small as possible.

Slight stiffness around the axis of turn can be obtained, in particular, if the cross-sectional height of the insulating element extending parallel to the plane of the pane of glass is less than its cross-sectional width, preferably a third to a half less.

It has been found favorable for the said turning movement that the insulating element have a taper, for instance in the middle of the cross section.

In one special embodiment of the invention, the connecting place consists of a suspending of the mounting section in the facade substructure, as a result of which a simple development of the place of connection and an easy assembly are achieved.

Preferably, the connecting place consists of an extension piece of the mounting section, which piece is spaced from the inner bend and extends in the direction towards or away from the edge of the pane of glass, the extension piece engaging in a correspondingly shaped recess in a profiled part of the facade substructure, and of a connecting part which connects the mounting section preferably having play in order to permit the predetermined turning movement of the mounting section as a result of the play and/or the elasticity of extension piece and connecting part. In order that the axis of turn for the predetermined turning movement can be adjusted also in the region of the connecting place, it is seen to it, by special developments of this connecting place, the axis of turn can readily form within this region. In this connection, it is necessary, in particular, for a constraint-free arrangement to be provided between the mounting section and the extension piece.

The predetermined turning movement is furthermore facilitated by an extension piece, preferably of arcuate cross section, since, in the region of the connecting place, a sort of rotary joint is formed by the development of the extension piece. This advantageous form of development also permits expansions or contractions of the glass pane or panes since constraint-free longitudinal displacements in the direction of the plane of the pane of glass can take place in the region of the connecting place.

A preferably arcuate cross section of the extension piece assists in the predetermined turning movement, since a sort of rotary joint is formed in the region of the connecting place.

The connecting place can also consist of a lengthwise-slide joint, in particular in the form of a plug connection, having a web which extends perpendicular to the plane of the pane and a recess surrounding said web, an elastic material being arranged between the web and the recess in order to permit the predetermined turning movement of the mounting section by the provision of elastic material and/or by the elasticity of the web. With this development, there is created a connecting place of very simple development, it being furthermore possible to dispense with an insulating element which prevents the transfer of heat since the arrangement of the elastic material furthermore prevents a transfer of heat.

For an additional reduction in unit weight and/or as safety in the event of fire, metallic shaped pieces are preferably arranged on the edge of the pane of glass, preferably on the mounting section, between the pane of glass and the facade substructure. In the event of attachment of the metallic shaped pieces by means of a screw fastening, it can furthermore be provided that the individual screws have play in order thereby not to interfere with the necessary predetermined turning movement.

As safety in the event of fire, parts of the insulating element may also consist of metal, in which case these parts which are provided merely in individual sections, do not interfere with the predetermined turning movement of the mounting section even if the axis of turn is developed in the region of the insulating elements.

For static and/or aesthetic considerations, it may be desirable or necessary for the mounting sections to be arranged on all edges of the pane of glass.

The mounting sections may, for aesthetic reasons, advantageously be arranged continuously on the edges of the pane of glass up into the corner regions of the pane. In order that the mounting sections can expand without constraint in the corner regions, the free ends of the mounting sections are spaced apart in the corner regions.

Expansion-take-up parts or corner moldings, in particular in the form of elastomer parts or special-steel parts, are preferably arranged in the corner regions of the pane of glass, adjoining the mounting sections. These corner moldings grip over the free ends of the mounting sections 6 and see to it that the expansions of the mounting sections can take place without constraint.

The arrangement of the mounting sections in accordance with the invention is advantageously suitable for use in single or multiple glass systems, the dimensions of the panes in the case of multiple glass systems possibly being of different dimensions. With the proposed arrangement of mounting sections all systems of panes of glass can, accordingly, be provided.

BRIEF DESCRIPTION OF THE DRAWINGS

The invention will be explained below by way of example on basis of advantageous embodiments with reference to the drawing, in which:

FIG. 1 is a cross section through a mounting section arranged on the edge of a pane of glass;

FIG. 2 is a cross section through a mounting section;

FIGS. 3 to 9 are cross sections in accordance with FIG. 1, showing in each case different mounting sections;

FIGS. 10 and 11 are cross sections through edge regions of a laminated glass pane consisting of a plurality of individual panes and provided with a mounting section;

FIGS. 12 and 13 are cross sections through edge regions of a pane of glass consisting of two individual panes with photovoltaic elements arranged between them, provided with a mounting section;

FIGS. 14 and 15 are different cross sections through edge regions of a double glazing of stepwise development with mounting section, heat insulating element for preventing heat transfer, and parts of the facade substructure;

FIG. 23 is a cross section according to FIGS. 14 and 15, but without insulating element;

FIGS. 24 to 26 are a cross section in accordance with FIGS. 14 and 15 in the case of a double glazing without stepwise development;

FIGS. 27 and 28 are very diagrammatic cross sections according to FIGS. 14 and 15 in the case of a single glazing; and FIG. 29 is a top view of the region of a corner of a pane of glass with mounting sections extending along the edges of the pane of glass.

DETAILED DESCRIPTION OF THE PREFERRED EMBODIMENT

Figure 5:
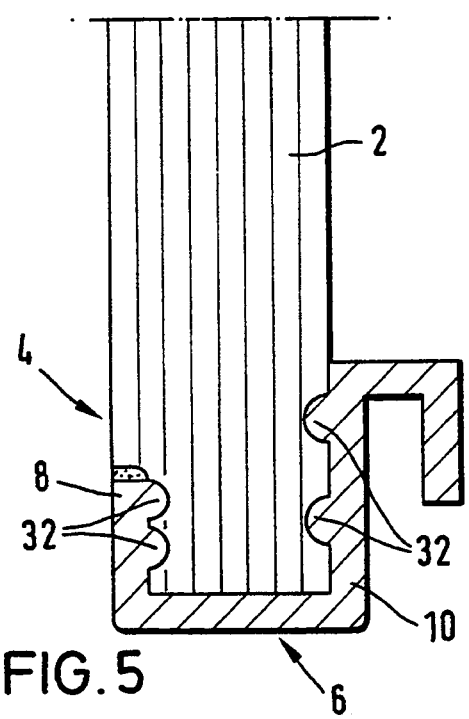

FIG. 1 is a cross section through a pane of glass 2 having a mounting section 6 arranged on the edge 4 of the pane of glass. The pane of glass 2 shown can be a pane of a single glazing or a pane, arranged on the weather side, of a multiple glazing which can represent elements for instance of an outer wall or roof glazing. The mounting section 6 has in the region of the edge 4 of the pane of glass a substantially U-shaped cross section consisting of an outer bend 8 arranged on the weather side, an inner bend 10 and a connecting web 12 which connects the two bends 8, 10 together. Adjoining the bend 12 via a connecting piece 14, there is an extension piece 16 which is spaced from the inner bend 10 and extends substantially parallel to the latter in the direction of an end region 18 of the pane of glass. The outer and inner bends 8, 10 surround the edge 4 of the pane of glass, resting firmly against it, the connecting piece 12 also resting firmly against the end region 18 of the pane of glass. The connecting web 12 of the mounting section 6 is inserted in a facade substructure.

The mounting section 6 shown is arranged on at least two opposite edges of the pane of glass and, therefore, for instance, on the horizontally extending upper and lower edges of the pane of glass 2, or else on the vertically extending lateral edges of the pane of glass 2. For static or aesthetic considerations, the mounting section 6 can, however, also be arranged on three or all four edges of the pane of glass 2. At the corresponding edges of the pane of glass 2, the mounting section 6 can be provided, extending in sections or up to the corner regions of the pane of glass 2.

In the lower region of the edge 4 of the pane of glass, the pane is provided, on the weather side, with a recess or step 20 into which the outer bend 8 engages in such a manner that the weather side of the glass pane 2 and the outer side of the outer bend 8 lie in the same plane.

The upper edge 22 of the outer bend 8 which faces the pane of glass 2 is rounded, as is the step 20 in the pane of glass 2 within this region. The transition regions between the outer and inner bends 8, 10 and the connecting web 12 arranged between them can also advantageously be rounded, as well as the end edges 28, 30 of the pane of glass within this region.

Between the mounting profile 6 and the edge 4 of the pane of glass a seal is provided, at least in the region of the free end of the outer bend 8. For a better connection, the mounting section 6 has a friction-increasing coating and/or a bonder, for instance a two-component epoxy bonder, on its surfaces which face the edge 4 of the pane of glass. As shown in the drawing, the inner bend 10 is longer or higher than the outer bend 8.

FIG. 2 shows a cross section through the mounting section 6 before application to the edge of a pane of glass, the section having been pre-bent for better attachment to the corresponding edge of the pane of glass. As can be seen, the mounting section 6 must be pushed open before the introduction of a pane of glass. The residual tension assures the strengthening of the connection between the mounting section 6 and the corresponding edge of a pane of glass.

The mounting section 6 is made, for instance, of special steel or aluminum and is preferably electrolytically colored black or anodized so that it can be adapted to the color of the panes of glass, for instance, of an outer facade.

FIGS. 3 to 9 show cross sections similar to FIG. 1 with, in each case, mounting sections 6 of different development, the reference numbers of FIG. 1 having been adopted for identical parts.

FIG. 3 shows that the connection between the mounting section 6 and the edge 4 of the pane of glass 2 can be strengthened by the outer bend 8 being tapered in wedge shape from its free end in the direction towards the end region 18 of the pane of glass.

FIG. 4 shows that the inner bend 10 can also have such a wedge-shape development so that the outer bend 8, the connecting web 12 and the inner bend 10 form a dovetail groove, into which the correspondingly shaped edge 4 of the pane of glass 2 engages.

In addition to the special embodiments in accordance with FIGS. 3 and 4, the mounting section 6 can also have other mounting devices which form a positive engagement, as shown in FIGS. 5 to 8. The mounting devices shown can, however, also be provided independently of the wedge shape shown in FIGS. 3 and 4.

FIG. 5 shows elevations 32 developed on the surfaces of the outer and inner bends 8, 10 which face the edge 4 of the pane of glass, which elevations may be arranged continuously or intermittently on the corresponding surfaces. In FIG. 5, for example, the elevations 32 are arranged in pairs on the outer and inner bends 8, 10. In similar manner, the edge 4 of the pane of glass 2 is provided with recesses or depressions into which the elevations 32 engage. The depressions are, in this connection, ground into the edge 4 of the pane of glass. The elevations 32 can also consist of individual spaced knobs which engage either in continuous depressions on the edge 4 of the pane of glass or into individual depressions. Individual or point-shaped depressions in the edge 4 of the pane of glass can be ground therein by means of a spot drill.

Figure 6:
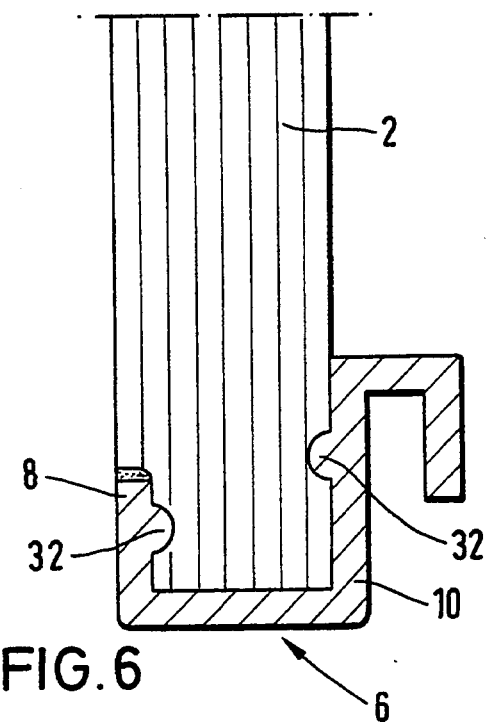

FIG. 6 shows that the elevations 32 can also be arranged individually on the surfaces of the outer and inner bends 8, 9 which face the edge 4 of the pane of glass. The elevations 32 shown serve as additional mounting means between the mounting section 6 and the edge 4 of the pane of glass 2.

Figure 7:
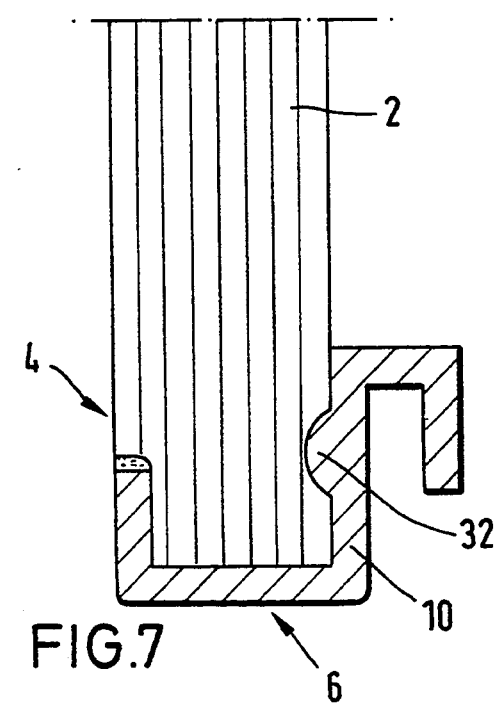

Another variant is shown in FIG. 7, the elevation 32 being provided merely on the inner bend 10. For reasons of manufacture, it is advantageous for the elevation 32 to consist of a continuous elevation which engages in a corresponding depression on the edge 4 of the pane of glass.

Figure 8:
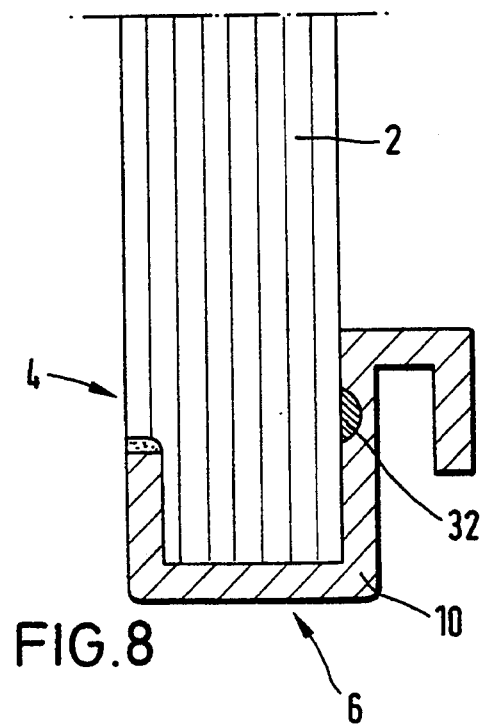

FIG. 8 shows that the edge 4 of the pane of glass 2 can also have the elevation 32 which then engages into a correspondingly shaped depression in the inner bend 10. This preferably continuous elevation 32 is applied by screen printing, particularly in enamel, or on the edge 4 of the pane of glass. All said elevations 32, depressions and arrangements of knobs as well as individual depressions advantageously extend in this connection parallel to the edge 4 of the pane of glass.

FIG. 9 shows the use of a mounting section 6 in the case of a laminated pane of glass 34 which consists of an inner pane of glass 16 arranged on the room side and of an outer pane of glass 38 arranged on the weather side, the thickness of the outer pane of glass 38 corresponding approximately to the cross-sectional thickness of the outer bend 8. Between the inner pane of glass 36 and the outer pane 38, there is a transparent adhesive foil or else a transparent layer of casting resin. The outer pane of glass 38 is developed smaller than the inner pane of glass 36 around the edges on which a mounting section 6 is to be arranged. The outer bend 8 engages into the peripheral step produced by this development so that the outer pane of glass 38 and the outer bend 8 lie in the same plane. The size of step 40 is so selected that the end region 18 of the pane of glass and the connecting web 12 rest against each other without any intervening space.

FIG. 10 shows the use of the mounting section 6 in the case of a laminated glass pane 150 which consists of a plurality of individual panes with, in each case, a transparent adhesive foil or else a transparent layer of casting resin arranged between the individual panes. In contradistinction to FIG. 9, the individual panes are of the same length in the region of the lower edge 4 of the pane of glass. Thus, the material present between the individual panes is present also in the region between the outer and inner bends 8, 10 of the mounting section 6. In order to prevent the lower edge 4 of the pane of glass being pressed together upon a bending of the laminated pane of glass 50 by the clamping in the mounting section 6 and as a result of the elasticity of the material arranged between the individual panes, means which prevent such a pressing together are provided in the region between the outer and inner bends 8, 10. In FIG. 10, the means are shown as pressure-resistant inserts 154, which can also be referred to as stiff inserts. A sufficient stiffness is, for instance, present if the inserts 154 consist of metal or correspondingly hard plastic. As can be seen, the cross-sectional width of the pressure-resistant inserts 154 corresponds to the cross-sectional width of the material arranged in each case between the individual panes. The pressure-resistant inserts 154 thus prevent a pressing together of the lower edge 4 of the pane of glass so that the mounting section 6 can be used also with this type of laminated glass pane 150. If the means for preventing the pressing together of the lower edge 4 of the pane of glass were not present, the laminated pane of glass 150 might slip out from the mounting section 6 upon the bending.

FIG. 11 corresponds essentially to FIG. 10, with only the means for preventing the pressing together of the lower edge 4 of the laminated glass pane 150 being shown as another variant. Instead of the pressure-resistant inserts 154 of FIG. 10, in FIG. 11 the mounting section 6 is provided in the region of the connecting web 12 present between the outer and inner bends 8, 9 with free pins 156. The free pins are, in this connection, connected firmly or integral with the mounting section 6. What has been stated with regard to the pressure-resistant inserts 154 in FIG. 10 also applies with respect to the cross-sectional width of the free pins 156.

FIGS. 12 and 13 show a pane of glass 152 consisting of two individual panes, photovoltaic elements being arranged between the panes. The photovoltaic elements are preferably inserted in an intermediate foil layer and can thus in simple manner be arranged between the individual panes of such a pane of glass 153. As in the case of the laminated glass pane 150 of FIGS. 10 and 11, in the case of such an intermediate layer of photovoltaic elements the problem exists of the pressing together of the lower edge 4 of the pane of glass when such a pane 152 is held in its edge region by a mounting section 6. In order to avoid this pressing together in the lower edge 4 of the pane of glass 152, a pressure-resistant insert 154 is provided in FIG. 12 and a free pin 156 which is integral with the mounting section 6 is provided in FIG. 13. With respect to the cross-sectional width and the material of the insert 154 and of the free pin 156, reference is had to what has been stated with regard to FIGS. 10 and 11. With respect to the cross-sectional height of the pressure-resistant insert 154 or of the free pin 156 of FIG. 10 to 13, it is advisable for the cross-sectional height to correspond to the outer bend 8. Under certain conditions, it may also be advantageous for said cross-sectional height to correspond to the cross-sectional height of the inner bend 10. In FIGS. 12 and 13, plastic parts 50 adjoining the mounting section 6 are shown, they will be explained further with reference to FIG. 14.

All the possible embodiments of the mounting section 6 which have already been described are used also in the laminated glass panes or glass panes 150, 152 shown in FIGS. 10 to 13. In particular, in the case of the panes of glass 152 provided with the photovoltaic elements, the outer bend 8 of the mounting section 6 engages into the step 20 in the edge 4 of the pane of glass. By this development, heavy shadow on the photovoltaic elements resulting from an unfavorable position of the sun and caused by the outer bend 8 can be held within limits. The photovoltaic elements are, accordingly, no longer covered by, or are only slightly covered by, the shadow of the outer bend 8. The individual photovoltaic elements which are placed out of operation by such a shadow can namely not only produce no energy but act as blocking diodes so that an entire pane element with a large number of photovoltaic elements can be placed out of operation due to a shadow on individual photovoltaic elements.

The double glazing 42 shown in the following figures in all cases has the same structure and is developed with a step, i.e. the inside glass pane 44 arranged on the inside of the room is smaller continuously at the upper and lower edges than the outside glass pane 46 arranged on the weather side, from which the stepwise development results. The glass spacing and sealing elements are arranged between the two glass panes 44, 46. The panel 146 shown has, in principle, the same construction, it also having a step since the pane of glass 148 arranged as cover pane on the weather side is conducted further downward on the edge shown than the adjacent room-side region of the panel. It is also common to all the following arrangements shown that the mounting section 6 and the outer glass pane 46 to 148 lie in a single plane, as already described. So-called heat-insulating elements which, in the case of the same embodiment, are provided with identical numbers below, prevent heat transfer between the mounting section 6 and the facade substructure 48.

In FIG. 14, there is used as insulating element a plastic part 50 of approximately cubical cross section which is introduced into dovetail depressions of the inner bend 8 and of a profiled part 52 of the facade substructure 48 and thus represents a connecting element between the mounting section 6 and the facade substructure 48. For the additional taking up of weight and for fire protection, there serves another profiled part 54 which is arranged below the profiled part 52 and is screwed on with a bolt 56 of the facade substructure 48 and the profiled part 52, as indicated in dashed line. The load-bearing connection between the double glazing 42 and the facade substructure 48 consists of a bonding 58 between the inner glass pane 44 and the facade substructure 48 which, furthermore, has a sealing part 60 on its upper side. The edge of the inner glass pane 44 is supported on the profiled part 52, an elastic sealing material being introduced between them. The inside pane 44 is thus elastically bedded or supported by this development.

In the case of wind pressure or suction, the double glazing 42 will bend towards the room side or towards the weather side. In order that this bend in the region of the edge of the double glazing 42 does not lead to a break, a turning movement must be made possible there. In the case of the inner glass pane 44, the turning movement is assured by the elastic embedment. The outside pane of glass 46, however, has its edge gripped in firmly applied manner by the mounting section 6. In order that the glass not be broken, the mounting section 6 must be capable of turning together with the outside pane 46. Therefore, a predetermined turning movement around an axis of turn lying parallel to the edge of the glass pane outside of the latter and outside of the mounting section 6 must be made possible. This axis of turn is formed in the plastic part 50 on basis of its elasticity or its physical properties. The plastic part 50 can deform upon a bending of the outer glass pane 46 and thus a turning of the mounting section 6, so that the mounting section 6 can turn towards the room side and the weather side. Statically viewed, a sort of joint is formed in the plastic part 50, as a result of which only a small amount of moments of force can be transmitted into the region of the edge of the outside pane of glass 46. More advantageously, the plastic profiled part 50 is arranged as close as possible to the mounting section 6 so that the shortest possible lever arm to the mounting section 6 results. The necessary predetermined turning movement of the mounting section 6 which is necessary in order definitely to avoid the breaking of the glass can be calculated in accordance with the materials used and the dimensions of the parts cooperating in this region.

The further profiled part 54 is arranged only in sections over the entire edge of the double glazing 42 so that, if necessary, the profiled part 52 and the further profiled part 54 has play.

In a structural variant to FIG. 14, the securing of the double glazing 42 in the region of the bonding 58 can be effected by a screw which is arranged with play so that also in this variant a turning of the profiled part 52 can take place, if necessary. The inner glass pane 44 is then again elastically embedded and the turning of the outer pane 46, as well as of the mounting section 6, is permitted in the region of the plastic part 50. An additional depositing of the weight and safety in the event of fire can alternatively be obtained in the manner that the plastic part 50 has metallic inserts at individual places.

Such metallic inserts, however, do not prevent the turning of the mounting section 6 together with the lower edge of the outer glass pane 46 in such a manner that a break could occur in the region of the edge of the pane of glass.

Figure 15:
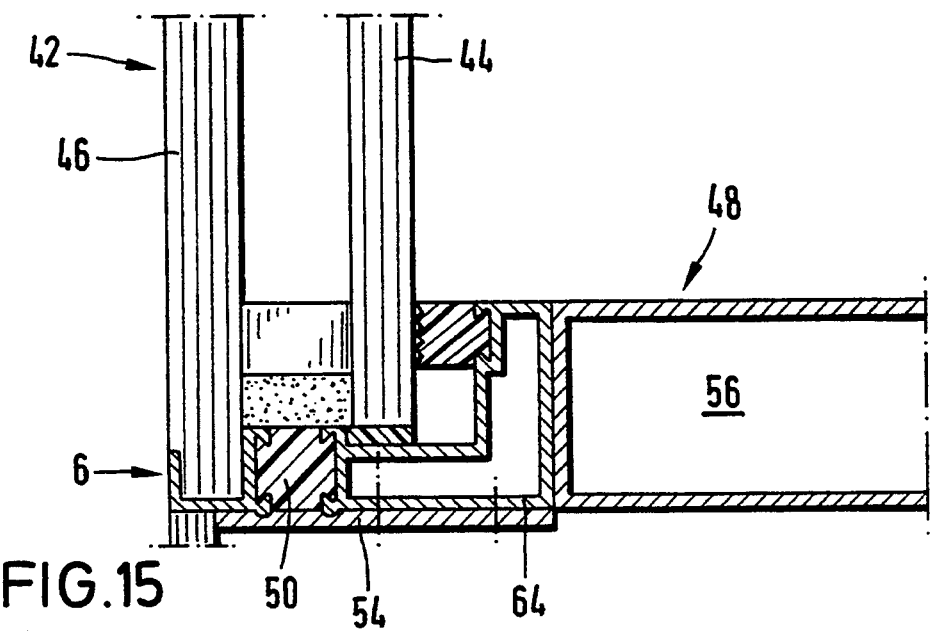

FIG. 15 shows the arrangement of the double glazing 42 on the facade substructure 48 via an auxiliary section 64 which is connected via suitable means to the cross bar 56 of the facade substructure 48. The arrangement of the mounting section 6 in accordance with the invention can accordingly also be used for double glazings 42 which are fastened without load-supporting bonding to the facade substructure of 48. Also in the case of this embodiment, the inner glass pane 44 is elastically embedded, as a result of which the required turning can be established. The turning of the outside glass pane 46 together with the mounting section 6 takes place, as explained in FIG. 14, in the region of the plastic part 50. The further profiled part 54 for the additional taking up of the weight of the double glazing 48 and for fire protection by the provision of which however the required turns are not prevented, is also shown.

A variant to FIG. 15 can consist of the use of a differently developed auxiliary section 64. The possibilities of turning of the double glazing 42 in the region of the edges of the inner glass pane 44 and the outer glass pane 46 are not changed thereby. The explanation of the different structural variants will show, among other things, that with regard to the possibilities for the connection of the double glazing 42 to the facade substructure 48, no limits are set as long as by an elastic embedment of the inner glass pane 44 and a possibility for the turning of the outer glass pane 46 together with the mounting section 6 a turning can result, for instance, in the region of the plastic part 50. It is also unimportant whether the auxiliary profile 64 adjoining the plastic part 50 on the side of the facade substructure is arranged rigidly or slightly moveable on the cross bar 56 of the facade substructure as long as the required turning can take place as a result of the physical properties of the plastic part 50. It should also be pointed out here that if the proposed arrangement of the mounting section 6 is arranged on the side edges of a double glazing 42, the cross bar 56 can also be replaced by a post of the facade substructure 48. Various fire protection safety measures have been described with respect to the preceding figures and are in part no longer shown in the following figures. It is essential, however, that the fire-protection means do not prevent the required turning.

Figure 16:
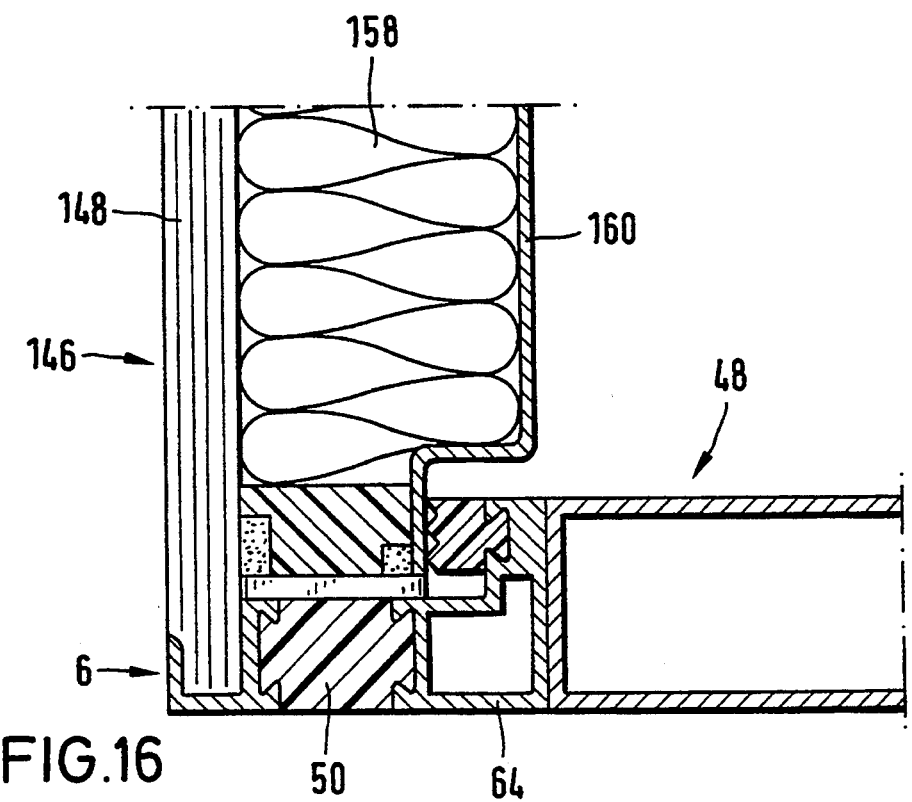
FIG. 16 is a cross section through the region of an edge of a panel having a pane of glass as cover pane, which has a mounting section.

FIG. 16 shows the use of the mounting section in the case of a panel 146. The panel has a glass pane 148 serving as cover pane on the weather side. Such panels 146 are used, for instance, when outer facades are to be glazed for aesthetic considerations but a view into or out of the room is not desired or necessary. In principle, the construction in FIG. 16 corresponds to that in FIG. 15, the panel region which adjoins the pane of glass 148 on the room side being merely provided instead of the inner glass pane 44 of FIG. 15. In the view shown, the panel region consists of an insulating material 158 and a cover 160 adjoining it. The pane of glass 148 is held in corresponding manner at its lower edge by the mounting section 6, which is adjoined by the plastic part 50 and thereupon the auxiliary profile 64—as also shown in FIG. 15. The turning of the pane of glass 148, together with the mounting section 6, takes place, as explained in FIG. 14, in the region of the plastic part 50. It is essential in this connection that, similar to the inner glass pane 44 of FIG. 15, the panel region adjoining the glass pane 148 be also embedded elastically and thus does not prevent the required turning of the pane of glass 148. The turning which takes place, after all, together with a bending of the pane of glass 148 is also not prevented thereby, since the insulating material 158 present between the glass pane 158 and the cover 160 is elastic, i.e. permits a bending of the pane of glass.

Figure 17:
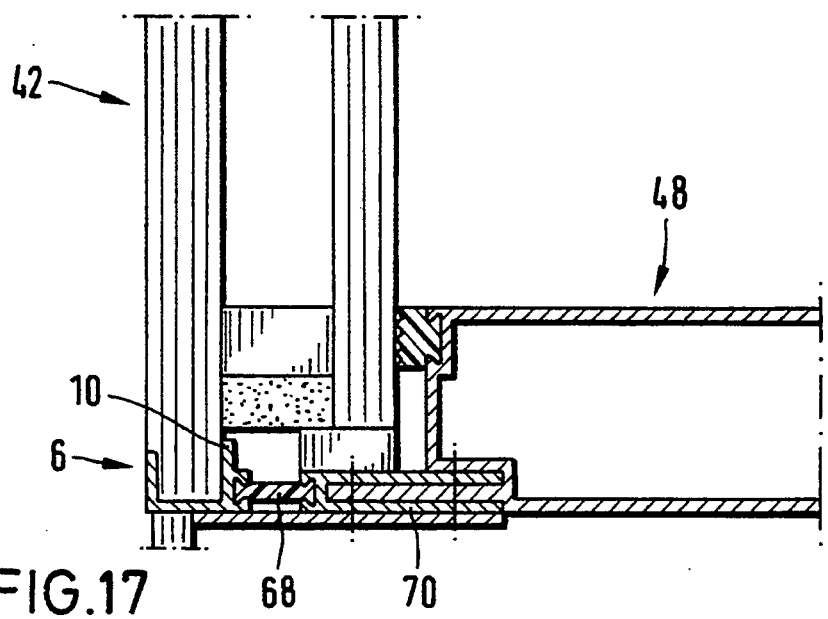
FIGS. 17 and 18 are different cross sections in accordance with FIGS. 14 and 15 with differently developed insulating elements.

In FIG. 17 there is again shown a double glazing 42 which is connected without bonding to the facade substructure 48. There are differences in this figure with respect to the development of the insulating element which is formed by an elongated plastic part 68 which engages in customary manner into the dovetail recesses of the inner bend 10 of the mounting section 6 and of an auxiliary profile 70. In the case of the plastic part 68, the cross-sectional height extending parallel to the plane of the panes of glass of the double glazing 42 is less than its cross-sectional width. As a result, there is obtained less stiffness of the plastic part 68 around the turning axis which is established in the region thereof to the edge of the panes of glass of the double glazing 42. The plastic part 68 still represents a sufficient connection between the double glazing 42 and the facade substructure 48, its bending or turning properties however being improved.

As an alternative, a plastic part of square cross section can serve at the lower edge of the double glazing 42 as connecting part between the mounting section 6 and the facade substructure 48. Such a plastic part then engages in corresponding rectangular recesses in the mounting section 6 and the facade substructure 48 and is secured there by screwing. Here also, the cross-sectional height of the plastic part extending parallel to the plane of the panes of the double glazing 42 is less than its cross-sectional width, whereby the turning or bending of the plastic part is facilitated. Another development of a plastic part can consist therein that the center region of its cross section is weakened, i.e. that the cross-sectional height extending parallel to the plane of the pane of the double glazing 42 has a taper. By such a taper, the stiffness of the plastic part with respect to the axis of turning which establish itself in this region is further reduced. For static considerations, it may be necessary that such a tapered plastic part cannot be arranged on the lower edge of the double glazing 42 but only at its upper edge or its side edges.

In this connection, it should also be mentioned that the inner pane of glass 44 of the double glazing 42 can also be supported on a blocking, without thereby the possibility of the lower edge of the inner pane of glass 44 turning being prevented. Upon a bending of the inner pane of glass 44, the lower edge of the pane of glass will rest with its preferably rounded edges on the blocking and turn around this edge. Breakage of the lower edge of the pane of the lower glass pane 44 will still be prevented since, in this region, the building up of the corner-edge loads as a result of an elastic yielding of the blocking itself and/or on basis of a yielding of the blocking or of the mounting parts below the blocking (fictitious angle of turn) is sufficiently prevented.

Figure 18:
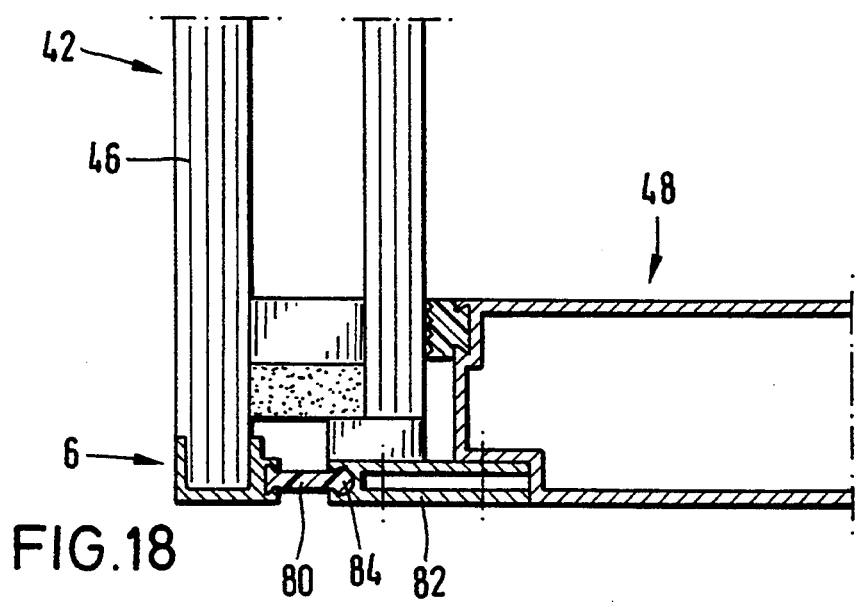

FIG. 18 shows another variant of a plastic part 80 which is connected to the mounting section 6 via a dovetailed recess and a rounded part 84 and engages in an auxiliary profiled section 82 via rounded part 84 into the correspondingly shaped recess in the auxiliary profiled section 82. There is thus produced a sort of articulated connection in which the rounded part 84 snaps into the recess of the auxiliary profiled section 82, i.e. is gripped around the greater part by the recess so that the plastic part 80 is clamped fast via the rounded part 84 of the recess of the auxiliary profiled section 82 but can be turned therein. The required turning movement of the lower edge of the outer pane of glass 46, together with the mounting section 6, is additionally promoted by this articulated attachment of the plastic part 80 to the facade substructure 48. The turning movement is therefore not based solely on the physical properties of the plastic part 80. The rounded part 84 can advantageously also be arranged on the side of the mounting section in order in this way to shorten the lever arm to the lower edge of the outside glass pane 46. It is also conceivable to connect the plastic part 80 on both sides to the rounded part 84 on the mounting section 6 or the auxiliary profiled section 82.

Figure 19:
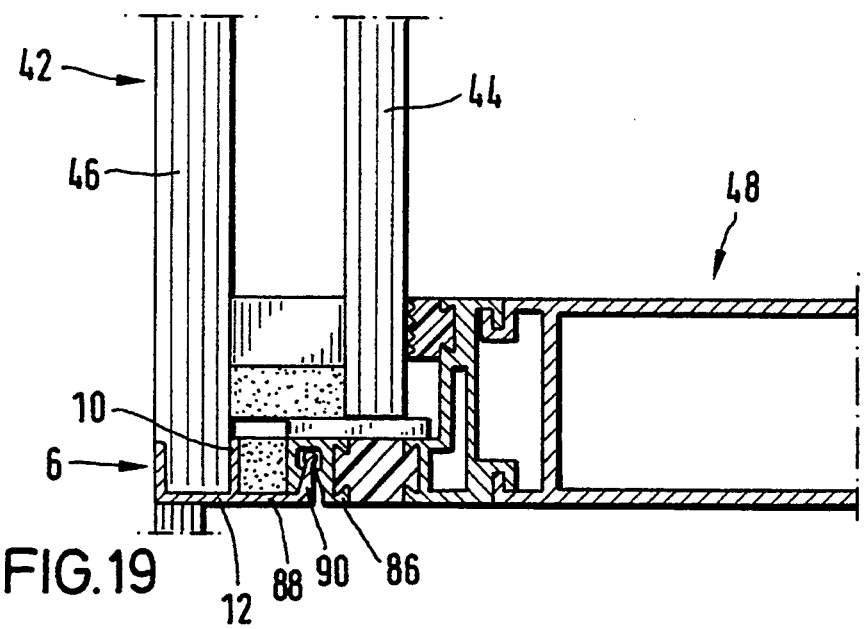
FIGS. 19 to 22 are different cross sections according to FIGS. 14 to 16 with an additional connecting place between mounting section and facade substructure.

FIG. 19 shows the connection of the mounting section 6 to a profiled part 86 of the facade substructure 48 via a special connecting point. The inner bend 10 is adjoined, as continuation of the connecting web 12, by a connecting part 88 which passes into an extension piece 90 which extends away from the edge of the pane of glass, is directed towards the center line of the pane of glass and passes parallel to the glazing. The connecting piece 90 is held with clearance in a recess of the profiled part 86 and has a thickening on its free end. The predetermined turning movement of the mounting section 6 is made possible on the one hand by the clearance between the extension piece 90 and the recess in the profiled part 86 and, on the other hand, by the elasticity of the connecting piece 90, as well as of the connecting part 88. Upon a turning of the double glazing 42 and thus of the outside pane of glass, the mounting section 6 can carry out a turning movement as a result of the said clearance and/or the elasticity of the said parts, so that breaking of the edge of the outer pane of glass 46 is avoided. The inner pane of glass 44 is again mounted in floating or elastic fashion so as, in this case also, to avoid a breaking within the region of the lower edge of the pane of glass.

Figure 20:
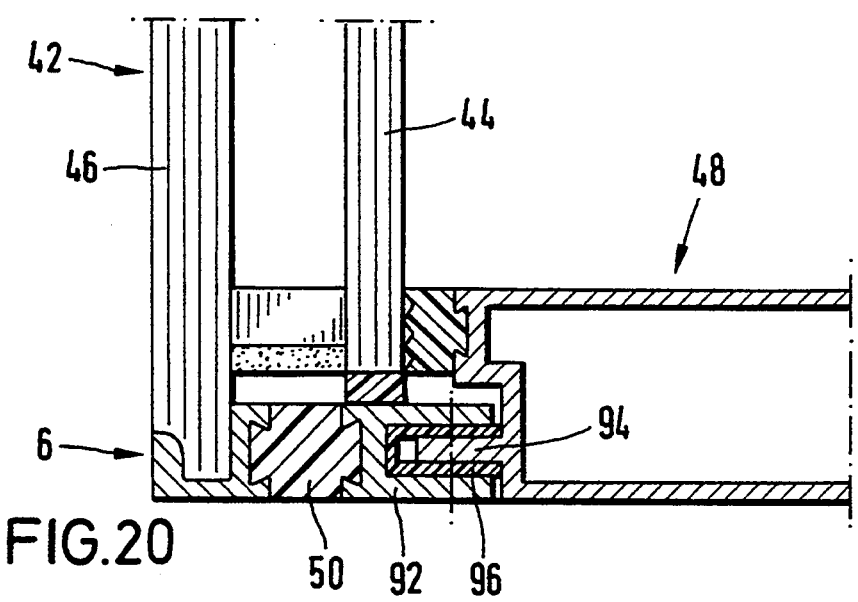
Figure 21:
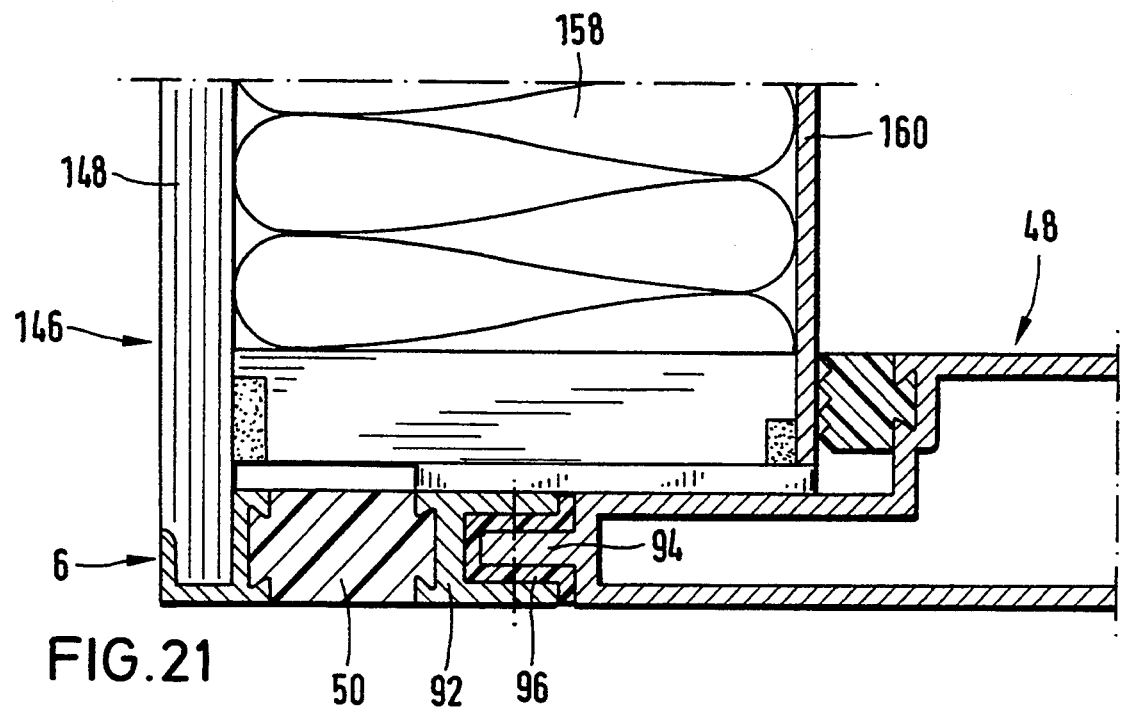

FIGS. 20 and 21 show another variant of the arrangement of the mounting section 6 on the facade substructure 48. Supporting the predetermined turning movement of the mounting section 6, a special connecting place is arranged alongside the plastic part 50 described, inter alia, in FIG. 10. This connection place consists of a profiled part 92 which adjoins the plastic part 50 and represents a recess in the direction towards the facade substructure 48, into which recess a web 94 which extends away from the facade substructure 48 engages. Between the web 94 and the recess of the profiled part 92, and elastic material 96 of sufficient thickness is arranged. Securing between the profiled part 92, and the web 94 is effected by a screw connection, the screw being arranged with play at the place of connection. The predetermined turning movement of the mounting section 6 together with the outer pane of glass 46 of the double glazing 42 or together with the outer pane of glass 148 is additionally made possible in the construction shown in the manner that the profiled part 92 can also move or turn as a result of the arrangement of the elastic material 96 and/or of the elasticity of the web 94. In order not to impede the turning movement of the profiled part 94, the screw connection has the aforementioned play. In order that the profiled part 92 is not interfered with by the arrangement of the inner glass pane 44 or the region of the panel 46 adjoining the pane of glass 148 on the room side, an elastic material, for instance a double-adhesive tape which can compress or expand in accordance with the turning movement of the profiled part 92, is provided between the lower edge of the inner pane of glass 44 or the corresponding region of the panel 146 and the profiled part 92.

With a suitable selection of material, it is also possible completely to dispense with the plastic part 50, as a result of which the predetermined turning movement takes place merely in the region of the profiled part 92 or of the web 94, this connection place representing a sort of lengthwise push joint. The elastic material 96 could then prevent the insulating transition.

Figure 22:
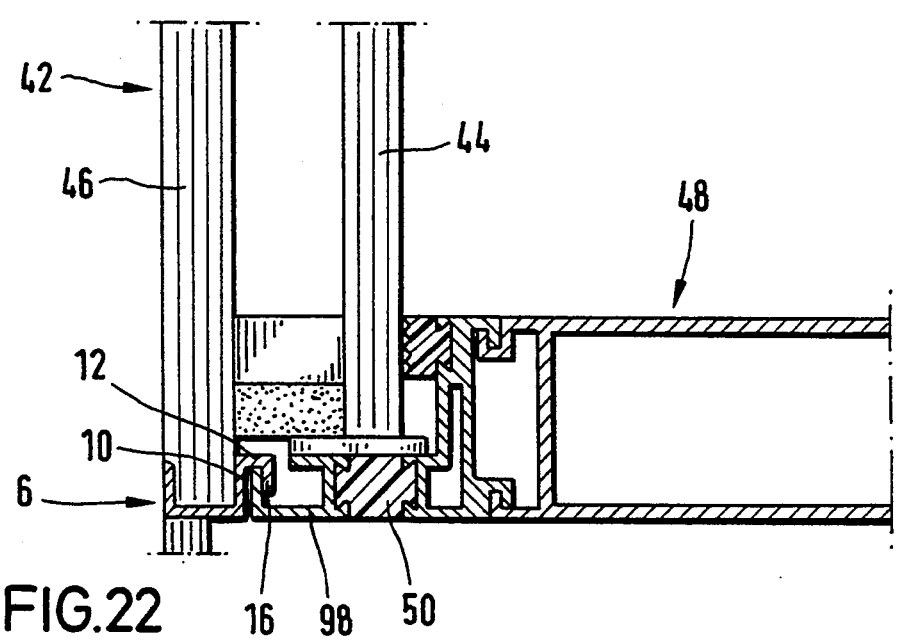

FIG. 22 shows the use of the mounting section 6 in the manner shown in FIG. 1. The attachment piece 16 which extends from the center line of the pane of glass in the direction towards the edge of the pane of glass in the direction towards the edge of the pane of glass of the double glazing 22 and parallel to the glazing engages in this connection in a recess in a profiled part 98. It is important in this case that a space be present between the inner bend 10 and the profiled part 98 so that the mounting section 6 can turn even if the outer pane of glass 46 bends outward as a result of wind suction. Therefore, no constraint should occur between the mounting section 6 and the adjoining profiled part 98. The predetermined turning movement at this connecting place shown in FIG. 22 takes place as a result of the elasticity of the extension piece 16 on the one hand and, on the other hand, of the connecting web 12 which connects the extension piece 16 to the inner bend 10. The plastic part 50 can in this connection additionally support the predetermined turning movement, the lower edge of the inner pane of glass 44 resting advantageously in this case via an elastic material or an elastic block on the plastic part 50.

As an alternative, the mounting section shown in FIG. 22 can have a special development. An arcuate extension piece on the inner bend 10 can adjoin the mounting section 6, said piece engaging in a recess of a profiled part which is also of arcuate development. The decisive factor in this connection is that, on the one hand, a distance is also present between the inner bend 10 and the profiled part so that the predetermined turning movement of the mounting section can take place. It must be made possible for the arcuate extension piece to carry out a turning movement which is not prevented by constraints within the recess of the profiled part. The predetermined turning movement of the mounting section 6 is additionally facilitated by the elasticity of the arcuate extension piece. Furthermore, the plastic part 50 can additionally promote the predetermined turning movement if, as explained with respect to FIG. 22, the connection between the lower edge of the inner pane of glass 44 with double glazing is elastic.

The variant of a connecting place developed in the manner of a plug connection between the mounting section 6 and the facade substructure 48 without the use of a plastic part as an insulating element, which was mentioned already with respect to FIGS. 20 and 21, is shown in FIG. 23. Adjoining the inner bend 10, there is a recess in the form of a double web into which the web 94 engages as part of the facade substructure 48. The elastic material 96 is arranged between the web 94 and the recess. The elastic material 16 serves in this connection, on the one hand, as insulating element to prevent the transfer of heat and, on the other hand, so that the mounting section 6 can carry out the predetermined turning movement. This predetermined turning movement is promoted by the elasticity of the web 94 which bends upward or downward corresponding to the turning movement of the mounting section 6. The securing between the recess and the web 94 is effected via screw attachment which has play so as not to prevent the predetermined turning movement as a result of constraints. With this variant, the inner pane of glass 44 can rest on a non-elastic material on the facade substructure 48, since the bending of the web 94 is not prevented by its protrusion-like development spaced from the other parts. The physical properties and thicknesses of material in the region of the connection place are, in this connection, a function of the maximum predetermined turning movement required of the mounting section 6 or the lower edge of the outer pane of glass 46 of the double glazing 42.

FIG. 24 shows that the arrangement of the mounting section 6 in accordance with the invention can be used also in the case of a double glazing 104 in which the inner pane of glass 106 and the outer pane of glass 108 have the same dimensions, namely a double glazing 104 without stepwise development. It is important in this connection that the inner pane of glass 106 be mounted in floating or elastic fashion in order thereby not to prevent the predetermined turning movement of the mounting section 6 or the lower edge of the outer pane of glass 108. The turning of the mounting section 6 is made possible by the plastic part 50, as has been explained, among other things, with reference to FIG. 14. The elastic embedding of the inner pane of glass 106 is effected by an elastic material 110 which is arranged in sufficient thickness between the lower edge of the inner pane of glass 106 and the profiled part 112 surrounding it. The profiled part 112 in the case of the embodiment shown is fastened via an adhesive 114 to the facade substructure 48. Since the material used for the bonding 114 is also elastic, the axis of turn for the predetermined turning movement of the mounting section 6, which axis is formed parallel to the edge of the pane of glass, can form also in the region of the bonding. In this connection, it depends on the properties of the material of the plastic part 50 whether the axis of turn for the predetermined turning movement is formed to a greater or less part also in the region of the bonding 114. A further profiled part 24 arranged, primarily as precaution for the event of fire, in sections in the region of the edge of the double glazing 104, does not prevent the predetermined turning movement since, on the one hand, it is present only in sections and, on the other hand, its bolting can have play.

Figure 25:
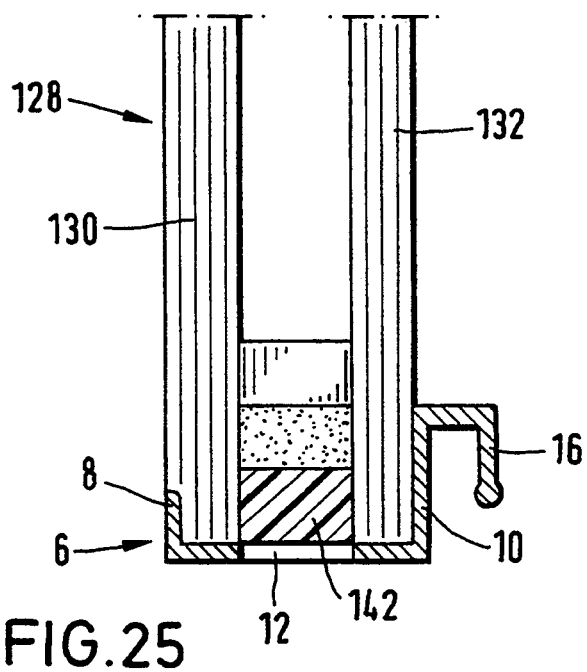
Figure 26:
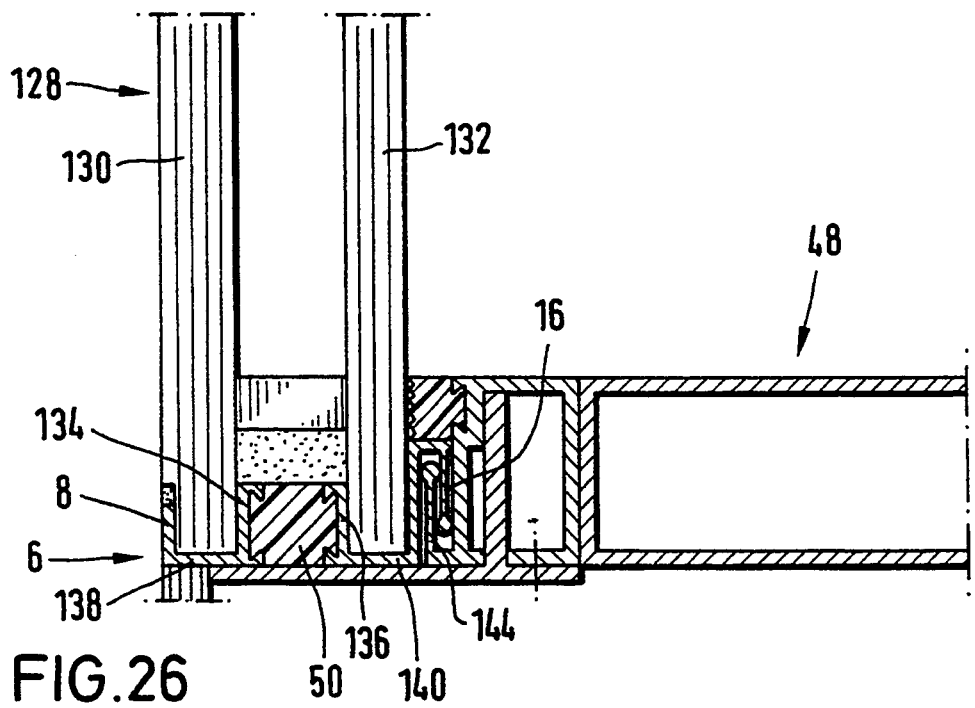

FIGS. 25 and 26 show that the arrangement of the mounting section 6 in accordance with the invention can be used also in the case of a double glass pane 128, in which case the outer glass pane 30 and the inner glass pane 132 have the same dimensions, i.e. there is a normal insulating glass and not a stepped glass. The double glass panes 128 shown are grasped firmly on the weather side of the outer pane of glass and on the room side of the inner pane of glass by the mounting section 6. As described, the mounting sections 6 have the outer and inner bends 8, 10 on the corresponding weather side and the corresponding room side.

In FIG. 25, between the outer and inner panes of glass 130, 132, an intermediate part 142 is arranged above the connecting web 12 and resting on it. The intermediate part 142 can, for instance, be a plastic part, in which case this part must be correspondingly hard in order to assure the firm gripping of the double pane 128 by the mounting section 6. The required predetermined turning movement of the mounting section 6 takes place around an axis of turn which is established at the place of connection of the attachment piece 16 to the profiled part of the facade substructure. Such a point of connection has already been described in connection with the foregoing figures, the attachment piece 16 possibly also having an arcuate cross section. As also described, the turning at the connection place results from the elasticity of the connecting parts on the one hand, and/or the presence of play between the connecting parts. It is important with this arrangement of the mounting section 6 on the double glass panes 128 that at least one of the sealing or spacing means present in the space within the double glass pane 128 is of such physical property that a relative movement of the outer and inner glass panes 130, 132 is definitely prevented, so that the firm gripping of the mounting section 6 around the lower edge of the double pane 128 is assured at all times. In particular, in order to avoid transfer of heat between weather side and room side as a result of the arrangement selected of the mounting section 6, the connecting web 12 of the mounting section 6 can be perforated, as indicated in FIG. 25, in the central region of the cross section of the connecting web 12.

In contradistinction to FIG. 25, FIG. 27 shows additional bends 134, 136 of the mounting section 6 which are arranged in addition on the room side of the outer pane 130 and the weather side of the inner pane 132. Instead of the connecting web 12, such as shown in FIG. 25, the mounting section 6 can be interrupted and the connection between the individual sections 138, 140 thus produced be replaced by a heat insulating element 50 which is resistant to pressure and tension. In this case, the mounting section 6 is divided into a partial section 138 serving as mounting-section part for the outer pane and a partial section 140 serving as mounting section part for the inner pane. The corresponding edges of the outer and inner glass panes 130, 132 are again firmly gripped by the outer bend 8, the further bend 134 and by the inner bend 10 and the further bend 136 respectively. As connection between the outer bend 8 and the further bend 134 and between the inner bend 10 and the further bend 136, there are employed in each case shorter connecting webs 12 as compared with FIG. 25. The heat insulating plastic part 50 which connects the two partial sections 138, 145 in compression-resistant and tension-resistant manner is inserted into dovetail recesses which are developed on the outsides of the two further bends 134, 136, facing in each case the space between the double pane 128.

In the embodiment of the invention shown in FIG. 26, the predetermined turning movement is made possible at the connecting place between the mounting section 6 or partial section 140 and the facade substructure, i.e. the turning axis is arranged in this region. The connecting place consists, as in FIG. 25, of an extension piece 16 which is arranged in a correspondingly shaped recess in the facade substructure 48. The extension piece 16 forms a recess by its distance from the inner bend and its direction extending towards the edge of the pane of glass parallel to the double pane. An extension part 144 formed like the extension piece 16 engages into said recess. The free end of the extension piece 16 and the free end of the extension part 144 each has a thickening, as a result of which clearance is produced at the connecting place between the connecting parts. The turning of the mounting section 6 or of the partial sections 138, 140 is assured again by the elasticity of the connecting parts at the connection place and the clearance present. As a function of the physical properties of the plastic part 50, an additional axis of turn can also be developed in this region.

In an alternative embodiment, the mounting section 6 can also be continuous in the region of the plastic part 50 so that a mounting part 6, such as shown in FIG. 25, would result, in which connection the further bends 134, 136 can also be provided in addition at the places indicated.

FIGS. 27 and 28, show in strongly diagrammatic form, cross sections through the arrangement in accordance with the invention in the case of a single glazing.

The mounting section 6 arranged on the pane of glass 116 has in both figures an arcuately shaped recess adjoining the inner bend 10. The connection between the mounting section 6 and a profiled part 118 consists in FIG. 27 of a plastic part 120 having two arcuate extension pieces. The profiled part 118, like the recess in the mounting section 6, also has an arcuate recess. The arcuate extension pieces of the plastic part 120 are inserted into these two recesses. The recesses surround, in this connection, the arcuate extension pieces to a considerable extent so that a dependable mounting of the plastic part 120 is assured. The required predetermined turning movement of the mounting section 6 together with the lower edge of the pane of glass 116 is made possible to a large extent by the connection, representing a sort of rotary joint, of the plastic part 120 to the mounting section 6 or the profiled part 118. In addition, the predetermined turning movement is made possible by the elasticity of the plastic part 120 since a bending of the plastic part 120 can take place within the region connecting the arcuate extension pieces. In order substantially to avoid moments of force in the region of the lower edge of the pane of glass, the plastic part 120 is arranged as close as possible to the pane of glass 116.

FIG. 28 shows a variant of FIG. 27 in which a plastic part 124 connecting the mounting section in a profiled part 122 engages into a dovetail recess in the profiled part 122. The predetermined turning movement can accordingly take place only by the arcuate extension piece of the plastic part 124 on the side of the mounting section 6 and the connecting region of the plastic part 124 between the mounting section 6 and profiled part 122. The arcuate extension piece of the plastic part 124 permits in this connection, together with the arcuate recess in the region of the inner bend 10, a turning movement of the mounting section 6, in which connection furthermore the connecting region of the plastic part 124 can bend in view of the elasticity present and thereby supports the predetermined turning movement.

FIG. 29 is a top view of the weather side of the pane of glass 2 in a corner region with mounting sections 6 passing by the edges of the glass panes and extending up into the corner region. The mounting sections 6 do not lie against each other in the corner region in order in this way not to cause any constraints in the corner region between the mounting sections 6 as a result of the different expansions of the pane of glass 2 and the mounting section 6. For reasons of tightness and for aesthetic considerations, there is provided in the corner region of a corner molding 126 which is pushed over the free ends of the mounting section 6 and clipped on there. Sufficient covering of the free ends of the mounting sections 6 by the corner molding 126 sees to it that even in the event of strong shortenings in the mounting sections 6, they do not emerge out of the corner molding 128. In similar fashion, the free ends of the mounting sections 6 are so spaced from each other in the corner region that even in case of strong expansions of the mounting sections 6, no constraints can arise in the corner region. The corner molding 126 is preferably adapted to the color of the mounting sections 6 and can consist, for instance, of a back elastomeric molding or of correspondingly colored special steel. An elastic sealing composition or a bonding assure the necessary seal between the corner molding 126 and the mounting sections 6.

I claim:

1. A mounting arrangement for mounting a curtain wall to a facade of a building, said curtain wall comprising a pane of glass having an inner face facing inwardly on said building, and outer face facing outwardly on said building and at least one end region extending between the inner and outer faces, said end region and portions of the inner and outer faces adjacent thereto defining an edge of said pane, the mounting arrangement comprising: a substantially rigid edge-engaging portion of generally U-shaped cross-section, the edge-engaging portion comprising a connecting web and spaced apart inner and outer flanges extending from the connecting web, the inner and outer flanges each having a pane engaging face, the pane engaging faces of the inner and outer flanges being spaced from one another for securely gripping the inner and outer faces respectively of the edge of the pane of the curtain wall, the inner flange further having a mounting face; the mounting arrangement further comprising connecting means extending between the mounting face of the inner flange and the facade of the building for permitting a predetermined turning movement of the substantially rigid edge-engaging portion relative to the facade of the building about an axis of turn between the inner flange and the facade of the building and parallel to the edge of the pane, whereby said predetermined turning movement of the substantially rigid edge-engaging portion about the axis of turn permits bending of the pane of glass of the curtain wall in response to wind and pressure differentials.

2. A mounting arrangement as in claim 1 wherein at least the outer face of the pane includes a stepped-down portion at the edge, the outer flange of the edge-engaging portion including an outer side, the outer flange being dimensioned such that the outer side thereof is substantially flush with areas of the outer face of the pane adjacent to the edge of the pane.

3. A mounting arrangement as in claim 1 wherein the inner and outer flanges of the edge-engaging portion are pre-bent toward one another to define a spacing therebetween less than the distance between the inner and outer faces of the pane along the edge thereof, such that the inner and outer flanges must be pushed apart for insertion of the edge therebetween and such that residual tension of the edge-engaging portion assures secure gripping of the edge of the pane of glass by the inner and outer flanges.

4. A mounting arrangement as in claim 1, wherein portions of at least one of the inner and outer faces defining the edge of the pane are non-planar, and wherein the pane engaging face of at least one of the inner and outer flanges are provided with non-planar portions for securely gripping the corresponding non-planar portions of the edge of the pane.

5. A mounting arrangement as in claim 4, wherein the non-planar portions of the edge of the pane are defined by at least one depression therein, and wherein a non-planar portion of at least one of the pane engaging faces of the inner and outer flanges comprises at least one elevation disposed and dimensioned for engaging the depression in the edge of the pane.

6. A mounting arrangement as in claim 4, wherein the non-planar portions of the pane of glass are defined by an elevation, and wherein the non-planar portion of the pane engaging face of at least one of the inner and outer flanges is defined by at least one groove therein dimensioned and disposed for securely engaging the elevation on the pane of glass.

7. A mounting arrangement as in claim 1 wherein the pane of glass is defined by a plurality of substantially parallel pane members, at least one insert disposed intermediate the pane members adjacent the edge for preventing pressing together of the pane members at the edge, edge portions of each of the pane members being securely engaged intermediate the inner and outer flanges of the edge-engaging portion.

8. A mounting arrangement as in claim 7 wherein the inserts define pressure resistant inserts for maintaining a selected spacing between the pane members.

9. A mounting arrangement as in claim 1 wherein the pane of glass is an outer pane of glass defining a weather side, and wherein there is further provided a second pane disposed inwardly from the outer pane, the connecting means of the mounting arrangement being configured and disposed to define the axis of turn inwardly of the inner pane and substantially adjacent thereto.

10. A mounting arrangement according to claim 9 wherein the inner pane is mounted to the facade of the building by an elastic material for permitting bending of the inner pane relative to the facade of the building.

11. A mounting arrangement as in claim 1 wherein the connecting means comprises a plastic heat insulating member for reducing heat transfer between the edge-engaging portion and the facade, the plastic part being deformable such that the axis of turn is disposed in proximity to the plastic heat insulating member.

12. A mounting arrangement as in claim 11 wherein the plastic heat insulating part has a stiffness selected in accordance with the predetermined pivoting for the mounting arrangement and bend characteristics of the glass.

13. A mounting arrangement as in claim 1 wherein the connecting means comprises a connecting part extending from the inner flange of the edge engaging portion and an extension piece extending from a portion of the connecting part spaced from the inner flange, the extension piece being dimensioned and disposed to engage a correspondingly shaped recess in the facade, the extension piece and the connecting part being formed to permit the pivotal movement of the edge-engaging portion relative to the facade.

14. A mounting arrangement as in claim 1 wherein the pane of glass is a double glass pane having an outer pane and an inner pane, the outer pane defining a weather side of the double glass pane and the inner pane defining a room side of the double glass pane, the weather side of the outer pane being securely engaged by the outer flange of the edge-engaging portion and the room side of the inner pane being securely engaged by the inner flange of the edge-engaging portion.

15. A mounting arrangement as in claim 14 wherein the edge engaging portion comprises first and second intermediate flanges, the first intermediate flange securely engaging a surface of the outer pane opposite the weather side and the second intermediate flange securely engaging a surface of the inner pane opposite the room side, an insulating element resistant to pressure and tension firmly connecting the first and second intermediate flanges.

16. A mounting arrangement for mounting a curtain wall to a facade, said curtain wall comprising a pane assembly having an inner face, an outer face and at least one end region extending between the inner and outer faces, said end region and portions of the inner and outer faces adjacent thereto defining an edge of said pane assembly, the pane assembly of said curtain wall being defined by a plurality of substantially parallel pane members, the mounting arrangement comprising: a substantially rigid edge-engaging portion of generally U-shaped cross-section, the edge-engaging portion comprising a connecting web and spaced apart inner and outer flanges extending from the connecting web, the inner and outer flanges being spaced for securely gripping the edge of the pane assembly of said curtain wall, pins rigidly connected to and extending from the connecting web of the edge-engaging portion for maintaining the pane members in spaced relationship and for preventing pressing together of the pane members at the edge; the mounting arrangement further comprising connecting means extending between the inner flange of the edge-engaging portion and the facade of the building for permitting a predetermined turning movement of the edge-engaging portion about an axis of turn between the inner flange and the facade of the building and parallel to the edge of the pane assembly, whereby the predetermined turning movement of the substantially rigid edge-engaging portion about the axis of turn permits bending of the pane assembly of the curtain wall in response to wind and pressure differentials.

17. A mounting arrangement for mounting an outer pane of glass of a curtain wall to a facade of a building, said outer pane of glass defining a weather side facing outwardly on said building, and inner side facing inwardly on said building and at least one end region extending between the weather and inner sides, said end region and portions of the weather and inner sides adjacent thereto defining an edge of said outer pane, and wherein there is further provided an inner pane disposed inwardly from the outer pane, the mounting arrangement comprising: a profiled part securely engaging edge regions of said inner pane and being connected to the facade of the building; a substantially rigid outer pane edge-engaging portion of generally U-shaped cross-section, the outer pane edge-engaging portion comprising a connecting web and spaced apart inner and outer flanges extending from the connecting web, the inner and outer flanges being spaced for securely gripping the inner and weather sides respectively of the end region of the outer pane; and connecting means extending between the outer pane edge-engaging portion and the profiled part for permitting a predetermined turning movement of the substantially rigid outer pane edge-engaging portion about an axis of turn intermediate the inner pane and the outer pane and parallel to the end region of the outer pane, whereby the predetermined turning movement of the substantially rigid edge-engaging portion about the axis of turn permits bending of the outer pane of the curtain wall in response to wind and pressure differentials.

18. A mounting arrangement according to claim 17 further comprising an elastic material intermediate the inner pane and the facade of the building, the elastic material permitting bending of the inner pane relative to the facade of the building.

19. A mounting arrangement for mounting a curtain wall to a facade, said curtain wall comprising a pane of glass having an inner face, an outer face and at least one end region extending between the inner and outer faces, said end region extending between the inner and outer faces, said end region and portions of the inner and outer faces adjacent thereto defining an edge of said pane, the mounting arrangement comprising: a substantially rigid edge-engaging portion of generally U-shaped cross-section, the edge-engaging portion comprising a connecting web and spaced apart inner and outer flanges extending from the connecting web, the inner and outer flanges being spaced for securely gripping the edge of the pane of the curtain wall; the mounting arrangement further comprising connecting means connecting the edge-engaging portion to the facade for permitting a predetermined turning movement of the edge-engaging portion about an axis of turn between the pane and the facade and parallel to the edge of the pane, the connecting means comprising first and second spaced apart supports extending inwardly from the inner flange and generally perpendicular to the pane of glass, elastic material disposed on opposed facing surfaces of the first and second supports to define a push joint therebetween dimensioned to engage an outwardly extending web on the facade, whereby the predetermined turning movement of the edge-engaging portion about the axis of turn permits bending of the pane of glass of the curtain wall in response to wind and pressure differentials.

* * * * *